June 10, 1947.　　　　L. V. STAGHEZZA　　　　2,421,813
NAVIGATION PROTRACTOR
Filed July 9, 1945　　　　3 Sheets-Sheet 3

Inventor,
Luis V. Staghezza
By
Young, Every & Thompson
Attys.

Patented June 10, 1947

2,421,813

UNITED STATES PATENT OFFICE 2,421,813

NAVIGATION PROTRACTOR

Luis Venancio Staghezza, Lomas de Zamora, Argentina

Application July 9, 1945, Serial No. 603,809

3 Claims. (Cl. 33—1)

1

The present invention relates to instruments, particularly protractors, used to facilitate the determination of a vessel's position. More particularly this invention relates to and has for its object the provision of a new and improved protractor which will facilitate the drawing of lines of altitude and the obtaining of the position without the aid of charts, as well as to plot courses and bearings.

The navigation protractor of this invention consists of a suitably shaped (preferably square) sheet of substantially rigid transparent material, the contour of which bears divisions corresponding to 360° and between two oppositely disposed marks (preferably those indicating 90° and 270°) has a rectangular relatively narrow slot one edge of which, hereinafter called the lower edge, is divided equally to indicate minutes totalling 60', whereas on the opposite upper edge an outer semicircle and a plurality of inner semicircles are drawn, the centers of which are successively displaced from the mid-point of the upper edge towards one of the ends thereof, from which end a plurality of secant lines of longitude at given latitudes are drawn at angles between 0° and 90° to said upper edge.

The purpose and uses as well as the arrangement of the various markings will become more clearly apparent from the following detailed description of a preferred embodiment in which reference is had to the accompanying drawings, in which.

Figure 1:
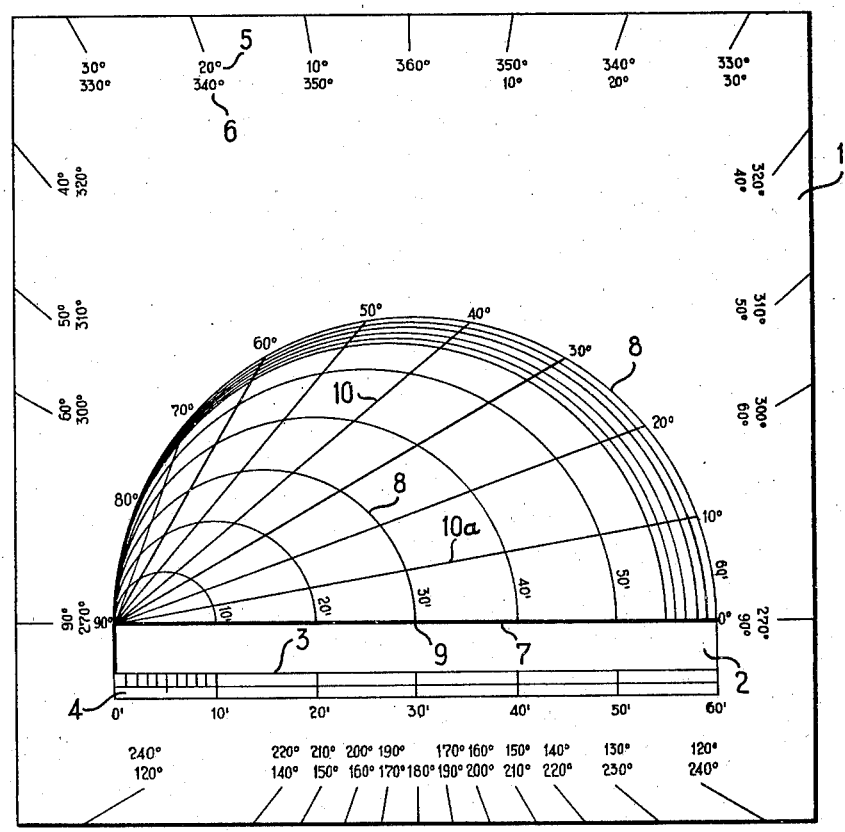
Fig. 1 is a plan view of an improved navigation protractor according to the present invention.

With reference to the drawings Fig. 1 shows a plan of my novel navigation protractor, which consists, as shown, of a square piece 1 of some suitably substantially rigid transparent material such as Celluloid, having a slot 2 cut therein relatively close to and parallel with one edge. The slot 2 is rectangular and relatively narrow and its longitudinal dimension is taken to represent a degree of longitude at the equator and/or a degree of altitude. One edge, therefore, of the slot, here shown as the lower edge 3 thereof, is divided sexagesimally to indicate minutes as shown at 4.

The perimeter of the member 1 is divided into angles the values of which may be given both clockwise and anti-clockwise as indicated by the sets 5 and 6. The arrangement is such that a pair of opposite gradations, preferably 90° and 270°, are alined with the upper edge 7 of the slot 2.

On the main body of the member 1 lying beyond said upper edge 7, and with centers on said edge a series of circles 8 is drawn, the centers of the circles being successively displaced from the midpoint 9 of the upper edge 7 towards that end of the upper edge which corresponds with the zero end of the lower edge 3.

From the same zero end of the upper edge 7, lines of longitude 10 are drawn making angles from 0° to 90° with said upper edge 7 and cutting the semicircles 8. Preferably the circles are shown to divide the lines 10 into suitable fractional parts of a degree, say minutes. The lines 10 it should be understood, each represent between the common origin and their ends where they cut the outer semicircle, the length of a degree of longitude at the latitude corresponding to their inclinations to the edge 7, and to the same scale as said edge 7 represents an equatorial degree of longitude.

Hence owing to the fact that an arbitrary length (that of the upper or lower edge of the slot 2) has been chosen to represent a degree of equatorial longitude equal to a degree of latitude and constant for all cases in the particular instrument, and the fact that all the remaining longitude markings depend on said length, the instrument may be and in practice is made independent of chart scales and the like, and may be used readily and rapidly on any piece of paper for obtaining the corrected position, provided that the latitude and longitude are known within a degree (as will usually be the case in navigation) and at least one observation has been taken.

Figure 2:
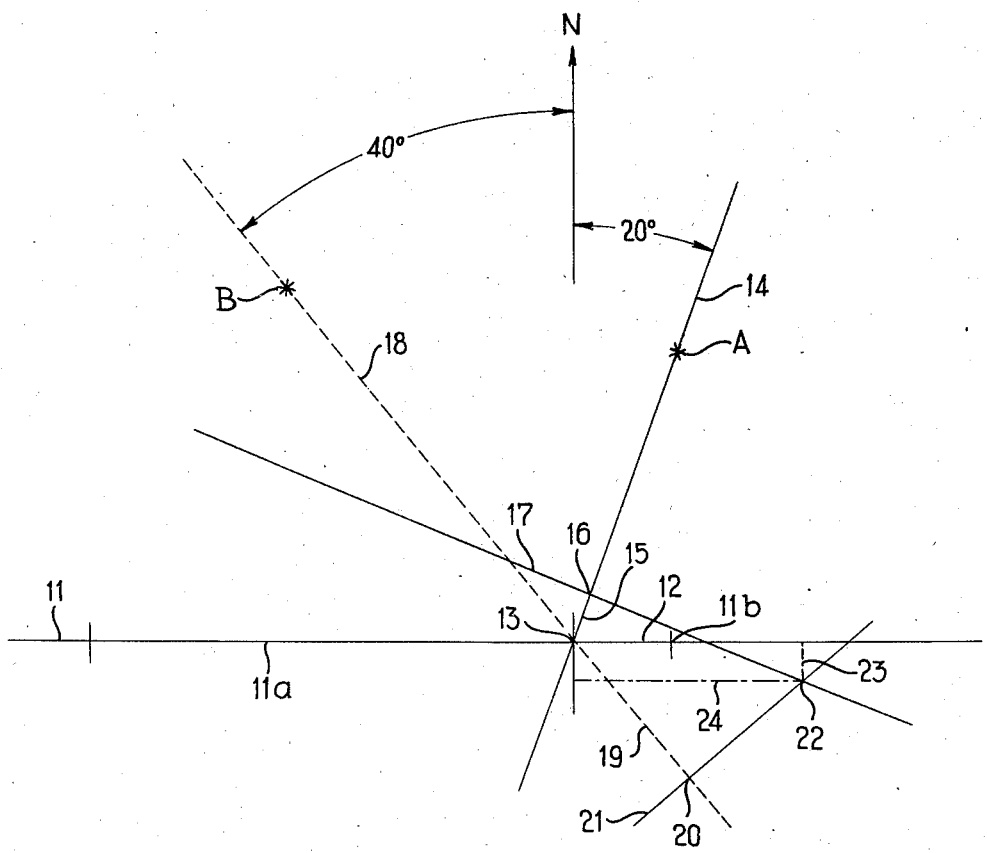
Fig. 2 is a diagram showing results obtained with my novel protractor.
Figure 3:
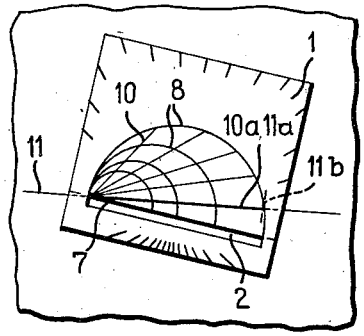
Figs. 3, 4, 5 and 6 show successive stages of the application of the protractor in obtaining the diagram of Fig. 2.

The following example will make this clear. Suppose the approximate position to be 10° N. and 50° W. with an estimated longitude of 50° 10', and that one star A has been observed with a bearing N. 20° E. with altitude difference between calculated and observed values of +5', and a second star B with a bearing of N. 40° W. with an altitude difference of —20'. To find the corrected position, and as illustrated in Figure 2, a datum line 11 is drawn on a sheet of paper and on it is marked off, by using the slot of the protractor, an intercept 11a equal in length to the line 10a corresponding on the protractor to lat. 10°. To obtain the intercept, a point (of origin) 11b is marked anywhere on the datum line 11 and the protractor is placed so that the end of the line 10a remote from the zero end of the edge 7 coincides with the point 11b. The point of the pencil is then inserted in the zero corner of the slot which is made to lie on line 11, and thus the other end of the intercept may be found accurately and easily, as indicated in Fig. 3.

Figure 4:
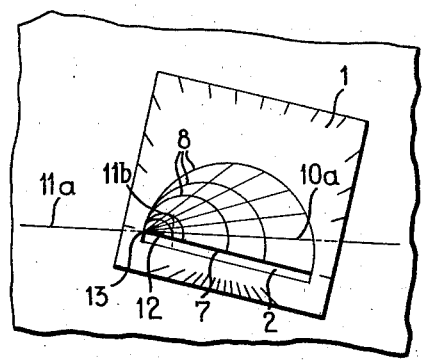

From one end of the intercept, a section 12 is marked off (using the slot of the protractor as indicated in Fig. 4) equal to the minutes of the estimated longitude (10' in the present example) measured along the line 10a corresponding to latitude 10°. This operation gives the point 13 in the datum intercept 11a.

Figure 5:
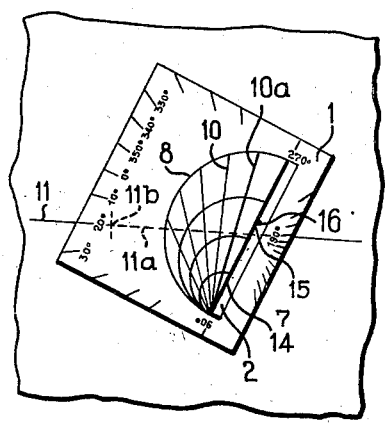
Figure 6:
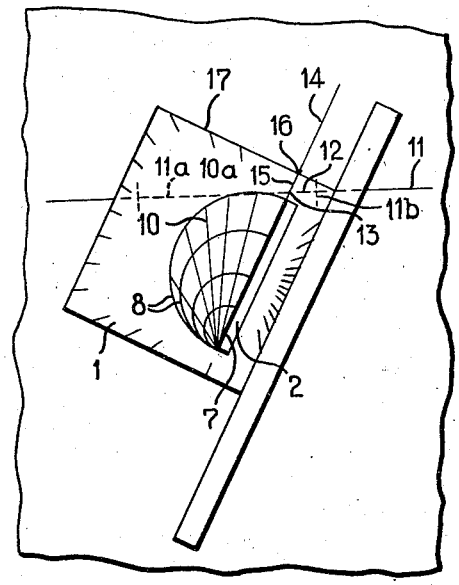

Then, using the protractor as shown in Figure 5, the azimuth line 14 of the star A is drawn through point 13 and from this point a portion 15 is marked off corresponding to the altitude difference measured along the edge 7. The portion 15 will be above line 11a if the difference is positive (+5' in this instance), and below the line 11a if negative (as in the case of star B in this example).

The end of the portion 15 remote from point 13 gives the point 16 through which is drawn a perpendicular 17 to the azimuth line 14, which perpendicular is one of the lines of position. Said line 17 may be drawn by sliding the protractor along a straight edge until the edge of the body perpendicular to the slot passes through point 16, and for this reason it is preferred to have the contour of the protractor rectangular or even square. However for this particular operation (and certain others as will be appreciated by those skilled in the art), the straight edge may be dispensed with since the edge 7 of the slot of the protractor may be made to coincide with any part of the line of azimuth 14 so that the perpendicular edge of the body of the protractor may be caused to pass through point 16 accurately at right angles to said line 14, or the portion 15.

Proceeding similarly, through the same point 13 is drawn the azimuth line 18 of star B and a section 19 is marked off from point 13 along line 18 and below the datum line, equal to the altitude difference (−20') of star B measured along edge 7. Through the end point 20 of section 19 a perpendicular 21 is drawn which is a second line of position and cuts the line 17 at a point 22 which gives the corrected position. The coordinates 23 and 24 are measured, the line 23 along the scale of differences of latitude (edge 7) and the line 24 along the corresponding line of longitude 10. The values in the present example are −4' or south 4' and −17' or east 17'. Hence the corrected position is lat. 10°−4'=9°56' N., long. 50°10'−17'=49°53' W.

While a preferred embodiment has been described it is to be understood that I do not desire to be limited thereto but may, without departing from the nature of the present invention, make such modifications as lie within the scope of the accompanying claims.

I claim:

1. A navigation protractor comprising a body of substantially rigid, transparent material having a contour including at least two straight mutually perpendicular edges, a slot in the body portion having an upper straight edge parallel to one of said straight edges, a series of subdivisions calibrated in minutes of a degree of equatorial longitude, parallel to and coextensive with said upper edge, an outer semicircle drawn on the side of the upper edge remote from the slot with said upper edge as diameter, a plurality of inner semi- circles drawn within the outer semicircle, with centers on the upper edge successively displaced from the midpoint of the upper edge towards one end thereof, a plurality of secant lines drawn from said one end to make varying angles with the upper edge and to cut said semicircles, said lines representing lengths of a degree of longitude at the latitude corresponding to the angular inclination of said secant lines to said upper edge, to the same scale as said upper edge represents an equatorial degree of longitude, and said inner semicircles dividing each of said secant lines into respective aliquot parts, the contour of the body being divided into angular degrees from a center coinciding with the midpoint of said upper edge.

2. A navigating protractor comprising a body of substantially transparent material having a contour including a straight portion, a slot in said body having a straight edge parallel to said straight portion, a scale calibrated in minutes of a degree of equatorial longitude, parallel to and coextensive with said straight edge, an outer semicircle drawn on one side of said straight edge with said edge as diameter, a plurality of inner semicircles drawn within the outer semicircle, with the centers on said edge successively displaced from the midpoint of the edge towards one end thereof, a plurality of secant lines drawn from said one end of varying angles with the said edge and to cut said semicircles, said lines each representing the length of a degree of longitude at the latitude corresponding to the angle between the respective line and the said edge, in the same proportion as said scale and said edge represent a degree of equatorial longitude, said inner semicircles dividing each of said lines into respective aliquot parts, the contour of the body being divided into angular degrees from a center coinciding with the midpoint of said straight edge.

3. A navigation protractor comprising a body portion of substantially transparent material having a rectangular contour, a rectangular relatively narrow slot in said body having an upper long edge parallel to one of the sides of the body, an outer semicircle drawn on said body on the side of said edge remote from the slot and with said edge as diameter, a plurality of inner semicircles drawn within the outer semicircle with centers on said edge successively displaced from the midpoint of the edge towards one end thereof, a plurality of secant lines drawn from said one end to said outer semicircle at varying angles with the said edge and to cut said inner semicircles, said edge representing to an arbitrary scale an equatorial degree of longitude and said lines each representing to the same scale the length of a degree of longitude at the latitude corresponding to the angle between the line and the edge and the lines being divided into fraction of a degree by the intersection therewith of said circles, said body having its contour divided into angular degrees about the midpoint of the said edge as center.

LUIS VENANCIO STAGHEZZA.

REFERENCES CITED

The following references are of record in the file of this patent:

UNITED STATES PATENTS

| Number | Name | Date |
| --- | --- | --- |
| 1,840,568 | Clark | Jan. 12, 1932 |
| 1,245,304 | Zona | Nov. 6, 1917 |